(12) United States Patent
Knoedgen et al.

(10) Patent No.: US 9,705,404 B2
(45) Date of Patent: Jul. 11, 2017

(54) CONTROLLER AND CONTROL METHOD FOR CONTROLLING A SWITCHED-MODE POWER CONVERTER IN CASE OF BREAK-THROUGH SITUATIONS

(71) Applicant: Dialog Semiconductor GmbH, Kirchheim/Teck-Nabern (DE)

(72) Inventors: Horst Knoedgen, Munich (DE); Manfred Weinacht, Dettingen unter Teck (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 647 days.

(21) Appl. No.: 14/134,189

(22) Filed: Dec. 19, 2013

(65) Prior Publication Data
US 2014/0252989 A1    Sep. 11, 2014

(30) Foreign Application Priority Data

Mar. 5, 2013 (EP) .................................... 13157869

(51) Int. Cl.
| | |
|---|---|
| G05F 1/00 | (2006.01) |
| H02M 3/335 | (2006.01) |
| H05B 33/08 | (2006.01) |
| H02M 1/32 | (2007.01) |

(52) U.S. Cl.
CPC ......... *H02M 3/33507* (2013.01); *H02M 1/32* (2013.01); *H02M 3/335* (2013.01); *H05B 33/0815* (2013.01); *Y02B 20/341* (2013.01)

(58) Field of Classification Search
CPC ..... H02M 3/156; H02M 3/158; H02M 3/1588
USPC ....................................................... 323/282
See application file for complete search history.

(56) References Cited

U.S. PATENT DOCUMENTS

| | | | |
|---|---|---|---|
| 6,944,034 B1* | 9/2005 | Shteynberg | ......... H02M 1/4258 323/282 |
| 2010/0026208 A1* | 2/2010 | Shteynberg | ........ H05B 33/0815 315/297 |
| 2011/0025251 A1* | 2/2011 | Arai | ....................... B41J 19/202 318/685 |

(Continued)

FOREIGN PATENT DOCUMENTS

DE    10048441    5/2002

OTHER PUBLICATIONS

European Search Report 13157869.2-1804 Mailed: Aug. 19, 2013, Dialog Semiconductor GmbH.

(Continued)

*Primary Examiner* — Adolf Berhane
*Assistant Examiner* — Afework Demisse
(74) *Attorney, Agent, or Firm* — Saile Ackerman LLC; Stephen B. Ackerman (57) ABSTRACT

The present document relates to power converters. In particular, the present document relates to the protection of the power switches of power converters. A controller configured to control a switched-mode power converter is described. The controller comprises a control pin for controlling a state of a power switch of the switched-mode power converter using a control signal; and a sensing pin for receiving a sensed current signal indicative of a current through the power switch. The controller is configured to detect a break-through situation of the power switch based on the state of the power switch and based on the sensed current signal.

14 Claims, 3 Drawing Sheets

(56) References Cited

U.S. PATENT DOCUMENTS

2012/0044673 A1* 2/2012 Catalano .................. F21V 7/06
362/184
2012/0169245 A1 7/2012 Chen

OTHER PUBLICATIONS

"New Insights Affect Power MOSFET Ruggedness," by John P. Phipps et al., Motorola Semiconductor product Sector, Feb. 1, 1988, IEEE, pp. 290-298.
Fairchild Semiconductor, Application Note AN-4147, "Design Guidelines for RCD Snubber of Flyback Converters," Dec. 31, 2006, pp. 1-5, found: http://www.fairchildsemi.com/an/AN/AN-4147.pdf on May 14, 2013.

* cited by examiner

CONTROLLER AND CONTROL METHOD FOR CONTROLLING A SWITCHED-MODE POWER CONVERTER IN CASE OF BREAK-THROUGH SITUATIONS

TECHNICAL FIELD

The present document relates to power converters. In particular, the present document relates to the protection of power switches of power converters.

BACKGROUND

The power switches used in power converters are typically submitted to substantial voltages. By way of example, the power switches of power converters used in applications which require a conversion of a mains voltage (at e.g. 230V) to a different output voltage may be submitted to peak voltages which are at a multiple of the mains voltage.

The submission to high voltages may cause avalanche effects within the power switches, which may eventually lead to a malfunction of the power switches and the power converters. In order to avoid such avalanche effects (also referred to as break down effects), power switches are typically over-dimensioned, such that the power switches are not operated at their respective operational limits. In particular, power switches having an increased break-down voltage are being used. However, the over-dimensioning of the power switches typically leads to increased costs, and it is therefore desirable to provide means which allow the selection of power switches that are operated near to their operational limits.

Alternatively or in addition, protection circuits (e.g. snubber circuits including a snubber capacitor) may be used to protect the power switch of a power converter. Such protection circuits may comprise energy absorbing circuits used to eliminate voltage spikes caused by inductances when the power switch of a power converter opens. Such protection circuits typically lead to additional losses of the power converters which are undesirable. Furthermore, the components of such protection circuits may need to be over-dimensioned in order to ensure safe operation of the power switches. The over-dimensioning of the protection circuits typically adds to the costs of the power converter.

In view of the above, it is desirable to provide a system and a method which allow the selection of power switches and/or associated protection circuits that have a reduced operational margin, in order to reduce the costs and/or the power losses of power converters comprising such power switches and/or protection circuits.

SUMMARY

According to an aspect, a controller configured to control a switched-mode power converter is described. The switched-mode power converter may comprise a transformer, such as a flyback converter. The controller may be implemented as an integrated circuit (IC). The controller may comprise a control pin for controlling a state of a power switch of the switched-mode power converter using a control signal. The state of the power switch may comprise an on-state and an off-state of the power switch, and the controller may be configured to generate a pulse width modulated control signal to alternate the power switch between the on-state and the off-state. The power switch may comprise a transistor, e.g. a metal oxide semiconductor field effect transistor (MOSFET).

The controller may comprise a sensing pin for receiving a sensed current signal indicative of a current through the power switch. Furthermore, the controller may be configured to detect a break-through (also referred to as a punch-through) situation (also referred to as an avalanche situation) of the power switch based on the state of the power switch and based on the sensed current signal. In particular, the controller may be configured to detect a break-through situation of the power switch by detecting that the sensed current signal is greater or equal to a current threshold, when the power switch is in off-state.

The controller may further be configured to provide an indication of a detected break-through situation to an entity external to the controller. By way of example, the controller may comprise a maintenance pin and the controller may be configured to provide an indication of a detected break-through situation at the maintenance pin. By doing this, an entity external to the controller may evaluate the break-through situation. In particular, the indication of the break-through situation may be used to select design parameters of the power switch and/or of a protection circuit of the power switch.

Alternatively or in addition, the controller may be configured to control a multi-stage converter comprising a first converter stage providing an input voltage to the switched-mode power converter. As such, the switched-mode power converter may correspond to a converter stage of the multi-stage converter (e.g. a converter stage subsequent or downstream of the first converter stage). The controller may be configured to control the first converter stage such that the input voltage is reduced, subsequent to detecting a break-through situation of the power switch. By doing this, the controller may be configured to reduce the risk of a break-through situation of the power switch. Hence, the controller may be configured to increase the lifetime of the multi-stage power converter.

As indicated above, the switched-mode power converter may comprise a transformer. A primary winding of the transformer may be arranged in series with the power switch. Power converters comprising a transformer may be particularly affected by break-through situations, due to peak voltages which are generated by leakage inductances of the primary winding of the transformer. The switched-mode power converter may comprise a protection circuit arranged in parallel to the primary winding and in series with the power switch. The protection circuit may e.g. comprise a resistor and/or a capacitance. The protection circuit may be configured to dissipate excessive energy which may be created at the transformer when switching the power switch from on-state to off-state. The indication of the break-through situation provided by the controller may be used to determine parameters of one or more components of the protection circuit (e.g. of a capacitor of the protection circuit).

According to another aspect, a driver circuit configured to provide a drive voltage to a load is described. The load may comprise a solid state light source, e.g. an LED or an LED array. The driver circuit may comprise a switched-mode power converter comprising a switch (or power switch). The power converter may comprise a transformer and/or an inductor (as outlined above) and the switch may comprise a transistor (as outlined above). The inductor may cause overshoots subject to a change of state of the power switch. The switched-mode power converter may comprise one or more of: a flyback converter, a buck converter, a boost converter, a buck-boost converter, and a single-ended primary-inductor converter. Furthermore, the switched-mode power converter may comprise combinations of such converters, e.g. a combination of a flyback converter and a buck converter. A particular example of a switched-mode power converter is a power converter comprising a tapped inductor. In general terms, the switched-mode power converter may be of a type which exhibits overshoots (e.g. due to an inductor). Such overshoots may be attenuated by a snubber circuit.

Furthermore, the driver circuit may comprise current sensing means configured to determine a sensed current signal indicative of a current through the switch. The current sensing means may comprise a current sensing resistor (also referred to as a shunt resistor) arranged in series with the switch. In addition, the driver circuit may comprise a controller according to any of the previous claims and configured to determine agate control signal for putting the switch into an off-state, based on the sensed current signal. Furthermore, the controller may be configured to detect a break-through situation of the switch.

The driver circuit may further comprise an output capacitor at the output of the switched-mode power converter, configured to store an electrical charge to be provided to the load. The driver circuit may be configured to transfer electrical energy from an inductor of the switched-mode power converter (e.g. from the primary winding of a transformer) to the output capacitor during the off-state of the switch. Furthermore, the driver circuit may be configured to store electrical energy in the inductor of the switched-mode power converter during the on-state of the switch.

According to a further aspect, a light bulb assembly is described. The light bulb assembly comprises a housing and a solid state light emitting device, located within the housing. Furthermore, the light bulb assembly may comprise an electrical connection module, attached to the housing, and adapted for connection to a mains supply. In addition, the light bulb assembly may comprise a driver circuit according to any of the aspects outlined in the present document, located within the housing, connected to receive an electricity supply signal from the electrical connection module, and operable to supply an output voltage to the light emitting device.

According to another aspect, a method for operating a controller and/or a driver circuit as outlined in the present document is described. The method may comprise steps which correspond to the features of the controller and/or driver circuit described in the present document. In particular, the method may comprise controlling a state of a power switch of a switched-mode power converter and receiving a sensed current signal indicative of a current through the power switch. In addition, the method may comprise detecting a break-through situation of the power switch based on the state of the power switch and based on the sensed current signal.

In particular, the method may be directed at product binning of the switched-mode power converter and/or of the driver circuit. For this purpose, the method may comprise assigning the switched-mode power converter and/or a driver circuit comprising the power converter to a category based on the detected break-through situation. By way of example, the power converter and/or driver circuit may be used in conjunction with different input voltages (e.g. different mains voltages). In particular, the power converter and/or driver circuit may be used in conjunction with 120V (e.g. US) or 230V (e.g. Europe) input voltages. As such, the category may comprise a first input voltage category (e.g. 120V) and a second input voltage category (e.g. 230V).

The occurrence of a break-through situation may be tested using a second input voltage corresponding to the second category (e.g. 230V). If a break-through situation is detected, the power converter and/or driver circuit may be assigned to the first category corresponding to a first input voltage (e.g. 120V) which is lower than the second input voltage. By doing this, the overall yield of the manufacturing process can be increased.

As outlined in the present document, the switched-mode power converter may be configured to convert electrical energy at an input voltage to electrical energy at an output voltage. The method may comprise varying the input voltage. In particular, the input voltage may be varied within a pre-determined voltage range (e.g. comprising the first input voltage and the second input voltage). Furthermore, the method may comprise determining an input voltage for which a break-through situation of the power switch occurs. In particular, the input voltage starting from which a break-through situation of the power switch occurs may be determined. By doing this, the avalanche margin of the power switch may be determined. In particular, the avalanche margin may be determined based on the difference between the input voltage at which the power converter is to be operated (e.g. the input voltage of the category of the power converter) and the input voltage starting from which a break-through situation of the power switch occurs.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

SHORT DESCRIPTION OF THE FIGURES

The invention is explained below in an exemplary manner with reference to the accompanying drawings.

DESCRIPTION OF THE PREFERRED EMBODIMENTS

As outlined in the introductory section, power converters may comprise protection circuits to protect the power switches of the power converters. Such protection circuit may comprise components which are external to an integrated circuit (IC) of the power converter (such as capacitors or inductors). Typically such external components are dimensioned to avoid any avalanche at the protected power switch. As the exact operational conditions of the power converter are not known (e.g. due to variations of a load coupled to the power converter), the external components are typically over-dimensioned, in order to provide an operation margin.

The over-dimensioning of the external components leads to an increased size of the resulting power converters. Furthermore, the power switch break down voltage becomes important. A power switch (e.g. transistor) with a higher break down voltage typically requires more silicon for a given on-resistance Ron than a transistor having a lower break down voltage. This leads to increased costs. In view of the above, it is desirable to allow for the measurement of the exact operational margin of the external components and/or of the power switches of the power converter.

In the present document, a system and a method for determining the occurrence of avalanche effects in a power switch are described. The occurrence of avalanche effects can be determined under actual operational conditions (e.g. using an actual load), thereby allowing the verification of the behavior of the power switch and/or of the associated protection circuit under actual operational conditions. By way of example, the power converter may be used to provide electrical power to an LED array, and a particular power converter may be combined with a particular LED array to form a particular LED based light bulb. Different LED arrays may exhibit different on-voltages and/or on-resistances. Using the system and method described in the present document, a particular power converter may be tested together with the particular LED array, thereby ensuring that the one or more power switches of the particular power converter are not submitted to avalanche effects.

In particular, the system and method described in the present document may be used to ensure that external components of the power converter (e.g. capacitors and/or inductors of a protection circuit) are reduced in performance and price, thereby reducing the cost of the power converter. Furthermore, production tolerances may be canceled out and the power converter may be operated under save conditions.

Figure 1:
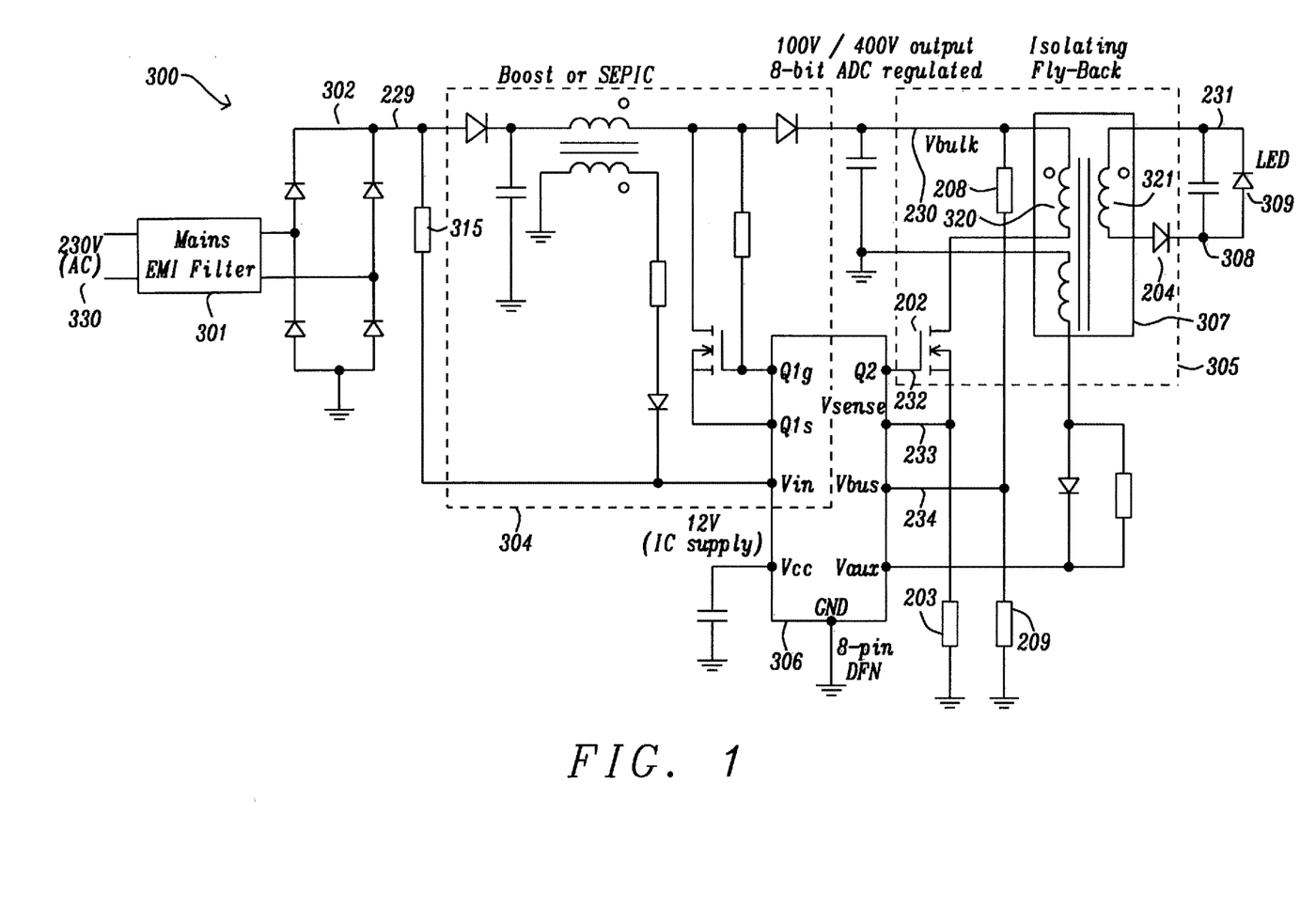
FIG. 1 shows a circuit diagram of an example driver circuit comprising a two-stage power converter.

FIG. 1 shows a circuit diagram of an example driver circuit 300. The driver circuit 300 may e.g. be comprised in a light bulb assembly and may be used to provide electrical power to a load 309 (which may e.g. be a light emitting diode, LED, or an LED array). The driver circuit 300 comprises an electromagnetic interference (EMI) filter unit 301 and a rectifier 302, in order to generate a rectified input voltage 229 from the main supply 330. Furthermore, the driver circuit 300 comprises a controller 306 which is configured to control a power converter of the driver circuit 300. The controller 306 may be started using a start-up resistor 315. In the illustrated example, the driver circuit 300 comprises a two-stage power converter with the first stage being a Boost converter 304 and the second stage being a flyback converter 305. The flyback converter 305 comprises a transformer 307 having a primary coil 320 and a secondary coil 321, and having an additional auxiliary coil for measurement purposes. The auxiliary coil may be used to provide information to the controller 306 regarding the output voltage 231 of the driver circuit 300. Furthermore, the driver circuit 300 comprises an output capacitor (or storage capacitor) 308 which stores the energy to be provided to the light source 309. The flyback converter 305 comprises a diode 204 which is configured to prevent a reverse energy flow from the output of the flyback converter 305 to the input of the flyback converter 305 during an off-state of the switch 202.

The first stage of the two-stage power converter is configured to convert the rectified input voltage 229 into a bulk voltage Vbulk 230. The bulk voltage 230 corresponds to the input voltage of the second converter stage 305. The bulk voltage 230 may be sensed using input voltage sensing means 208, 209, thereby providing the sensed voltage signal 234 to the controller 306. In the illustrated example, the input voltage sensing means 208, 209 are implemented using a voltage divider comprising the resistors 208, 209. Furthermore, a sensed current signal 233 is determined using current sensing means 203, and is provided to the controller 306. The sensed current signal 233 is indicative of the current through the power switch 202 of the flyback converter 305. In the illustrated example, the current sensing means are implemented using a shunt resistor 209 which is arranged in series with the power switch 202.

The controller 306 may be configured to determine a gate control signal 232 for putting the switch 202 of the second converter stage 305 into an off-state once the current Is through the switch 202 reaches a pre-determined peak current Ip. For this purpose, the controller 306 may make use of the sensed current signal 233 and/or of the sensed voltage signal 234, thereby ensuring that variations of the bulk voltage 230 can be compensated and corresponding variations of the output voltage 231 may be reduced or avoided, thereby reducing or preventing a flickering effect of the load (e.g. light source) 309.

Flyback converters such as the converter 305 typically produce excessive voltage spikes across the main power switch 202 due to a leakage inductor of the primary winding 320 of the transformer 307. The extent of these voltage spikes may depend on the load 309 of the flyback converter 305 and/or on the ratio of the transformer 307. These voltage spikes may lead to an avalanche of the power switch 202.

This technical problem may be addressed by over specification of the power switch 202 and/or by adding a protection circuit or a passive clamping circuit. Both measures lead to additional material cost. By means of the proposed system and method, the power switch 202 can be operated close to or at its break over voltage limit, thereby reducing the cost of the power converter 305.

In the present document, it is proposed to detect avalanche of the power switch 202 by sensing the presence of a current flow in the power switch 202 (e.g. a metal oxide semiconductor, MOS, transistor) during the off-state of the power switch 202. Avalanche typically does not damage the power switch 202 instantly. As such, the power converter system can react to the detection of avalanche and protect the power switch 202, in order to reduce the occurrence of avalanche and in order to increase the lifetime of the power switch 202. Furthermore, by reducing or completely avoiding the occurrence of avalanche, the power dissipation (energy consumption) can be reduced. By enabling the power converter system to detect avalanche and to react to avalanche, the amount of headroom that is normally used to protect the power switch 202 under a worst case assumption may be reduced.

Typical conditions under which a flyback converter 205 can go into avalanche are the use of an inappropriate protection circuit (e.g. snubber circuit) including a relatively large leakage inductor, the use of a relatively high input voltage 230 to the power converter 305, and/or the use of a relatively low load 309 at the output of the power converter 305.

In order to avoid avalanche under normal conditions (no break) the input voltage should be lower than the voltage at which avalanche occurs. Avalanche can be detected, if the transistor 202 is switched off and after the rise time of the voltage the transistor 202 has a break-through. Avalanche can be measured at the shunt resistor 203, because avalanche leads to a current flowing through the switch 202, even through the switch 202 is switched off. The current flowing through the switch 202 and through the serial shunt resistor 203 can be detected at the controller 306 of the driver circuit 300 via the sensed current signal 233.

Figure 2:
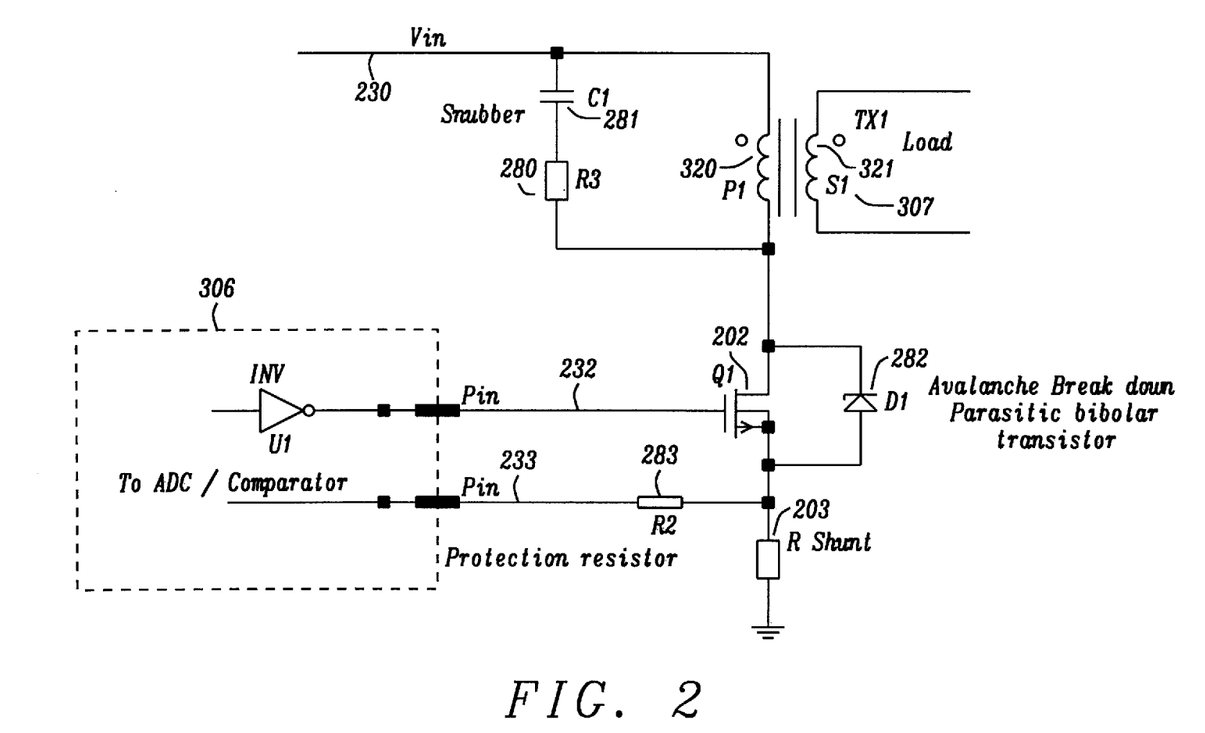
FIG. 2 illustrates an example protection scheme for the power switch of a power converter.

FIG. 2 shows an excerpt of the driver circuit 300 of FIG. 1. In particular, FIG. 2 shows example components of the driver circuit 300 which may be used to detect the occurrence of avalanche at the power switch 202 of the power converter 305, shown in FIG. 1. As outlined above, the controller 306, shown in FIG. 1, is configured to generate a gate control signal 232 for the power switch 202, in order to put the power switch 202 into an on-state and/or into an off-state, respectively. As such, the controller 306 is aware of the state (on-state or off-state) of the power switch 202. Furthermore, the controller is configured to receive a sensed current signal 233 indicative of the current through the power converter 202. The sensed current signal 233 may be provided by current sensing means, wherein in the illustrated example of FIG. 2 the current sensing means comprise the shunt resistor 203, identified as R Shunt, and a protection resistor 283, identified as R2.

The power switch 202 may go into avalanche when being submitted to a drain-source voltage which exceeds a pre-determined avalanche break down voltage. This is represented in FIG. 2 by the Zener diode 282 arranged in parallel to the power switch 202. The controller 306 may be configured to detect avalanche of the power switch 202 based on the gate control signal 232 and based on the sensed current signal 233. In particular, the controller 306 may detect an avalanche situation, when the gate control signal 232 indicates an off-state of the power switch 202 and when the sensed current signal 233 indicates a current through the power switch 202 which exceeds a pre-determined current threshold.

As outlined above, the power switch 202 may be protected from excessive (drain-source) peak voltages using a protection circuit. FIG. 2 shows an example protection circuit comprising a capacitor 281 and a resistor 280, which are arranged in series. The protection circuit may be arranged in parallel to the primary winding 320 of the transformer 307 of the power converter 305. The protection circuit may be used to dissipate excessive energy comprised within a parasitic inductance of the transformer 307 using the resistor 280. As a result, voltage peaks at the power switch 202 (notably voltage peaks which may occur, subsequent to putting the power switch 202 into an off-state) may be reduced. This typically leads to a reduced risk for avalanche of the power switch 202. On the other hand, the energy dissipation at the resistor 280 typically leads to increased energy losses of the power converter 305.

As outlined above, the controller 306 may be configured to detect avalanche of the power switch 202 based on the sensed current signal 233 and based on its knowledge regarding the state of the power switch 202. The controller may be configured to provide an indication of a detected avalanche situation, e.g. via a maintenance pin of the controller 306. The indication of the detected avalanche situation may e.g. be used during manufacturing of the power converter 305 or of the driver circuit 300, shown in FIG. 1, in order to make a selection regarding one or more external components of the protection circuit 280, 281. By way of example, a driver circuit 300 may be tested using a first (small) capacitor 281 in the protection circuit. If the controller 306 detects an avalanche situation, the first capacitor 281 may be replaced by a second (larger) capacitor 281 in the protection circuit, and the driver circuit 300 may be tested using the second capacitor 281. If no avalanche situation is detected, the driver circuit 300 may be ready for use (with the second capacitor 281), otherwise the process may be continued, until a sufficiently large capacitor 281 is determined, where no more avalanche situations occur.

Alternatively, or in addition, the indication of a detected avalanche situation may be used for tuning purposes, e.g. for determining a technical specification for the power switch 202, which reduces the risk for avalanche and which reduces the operational margin of the power switch 202.

Alternatively, or in addition, the controller 306 may be configured to adjust the control parameters of the one or more power converters 304, 305 which are controlled by the controller 306. By way of example, the controller 306 may be configured to control a multi-stage power converter as illustrated in FIG. 1. In such a case, the controller 306 may be configured to reduce the input voltage 230 to the power converter stage 305 comprising the power switch 202 for which avalanche has been detected. This may be achieved by adapting the control parameters for a preceding converter stage. In particular, the controller 306 may be configured to adapt the operation of the first converter stage 304 such that the bulk voltage Vbulk 230 is reduced, thereby reducing the risk of avalanche at the power switch 202.

As such, the controller 306 may be configured to detect avalanche situations at one or more power switches 202 controlled by the controller 306. Furthermore, the controller 306 may be configured to modify the operation of the power converter stages of a multi-stage power converter 304, 305, in order to reduce the risk of avalanche situations within the multi-stage power converter 304, 305. By doing this, the lifetime of the multi-stage power converter 304, 305 can be increased.

Hence, in a two-stage converter system (as illustrated in FIG. 1) the avalanche detection can be used for automatically reducing the bulk voltage 230. Furthermore, (e.g. in a one-stage converter system), the margin for the occurrence of avalanche may be determined. If the margin is below a pre-determined margin threshold, the converter system and/or the driver circuit may be used with a different input voltage. By way of example, the converter system and/or the driver circuit which has an avalanche margin below the pre-determined margin threshold may be used with 120V mains voltage instead of 230V mains voltage. As such, the determination of the avalanche margin may be used for product binning, i.e. for categorizing the converter system and/or the driver circuit.

Overall, the avalanche detection may be used to relax the tolerances of the critical components of the converter system. Furthermore, avalanche can be avoided for different temperature situations, as the break down voltage of power switches typically changes with the operating temperature of the power switch. In particular, the controller 306 may be configured to determine the temperature at which a power switch 202 enters an avalanche situation.

Figure 3:
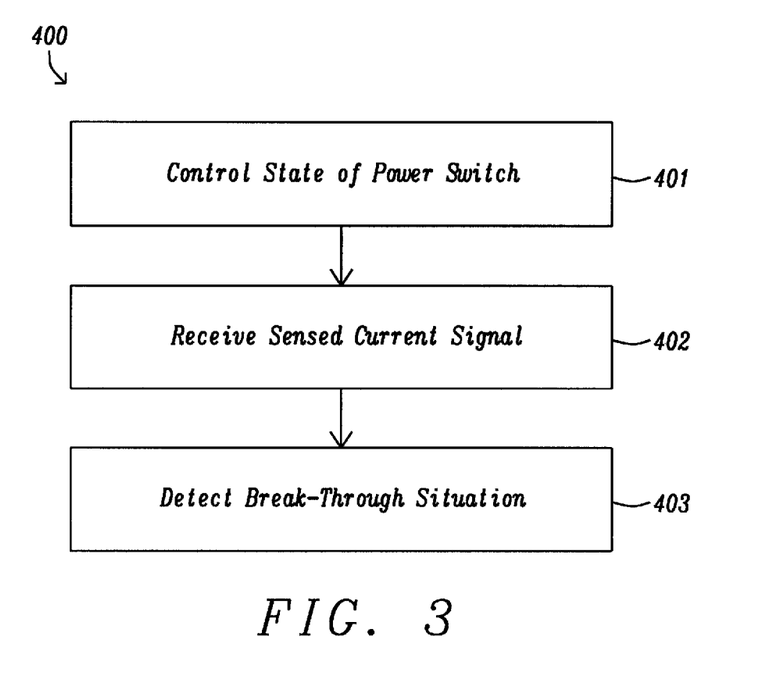
FIG. 3 shows a flow chart of an example method for determining an avalanche situation of the power switch of a power converter.

FIG. 3 illustrates a flow chart of an example method 400 for detecting a break-through situation or an avalanche situation of a power switch 202 of a switched-mode power converter 305. The method 400 comprises controlling 401 a state of a power switch 202 of the switched-mode power converter 305, e.g. using the controller 306 described in the present document. The state of the power switch 202 may be controlled using a pulse width modulated (PWM) signal applied to a gate of the power switch 202. The method 400 may further comprise receiving 402 a sensed current signal 233 indicative of a current through the power switch 202. Furthermore, the method 400 may comprise detecting 403 a break-through situation (also referred to as an avalanche situation) of the power switch 202 based on the state of the power switch 202 and based on the sensed current signal 233.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A controller configured to control a switched-mode power converter, being a converter stage of a multi-stage converter, comprising:
    a control pin for controlling a the state of a power switch of the switched-mode power converter using a control signal; and
    a sensing pin for receiving a sensed current signal, wherein the sensed current signal is indicative of a current through the power switch; and
    wherein the controller is configured to detect a break-through situation based on the state of the power switch and the sensed current signal;
    wherein the controller is configured to control a multi-stage converter comprising a first converter stage providing an input voltage to the switched-mode power converter; and
    wherein the controller is configured to control the first converter stage to reduce the input voltage subsequent to detecting a break-through situation of the power switch.

2. The controller of claim 1 wherein the state of the power switch comprises an on-state and an off-state of the power switch, and the controller is configured to detect a break-through situation of the power switch by detecting that the sensed current signal is greater or equal to a current threshold when the power switch is in an off-state.

3. The controller of claim 1 wherein the controller is configured to provide an indication of a detected break-through situation to an entity external to the controller.

4. The controller of claim 1 wherein the switched-mode power converter comprises a transformer with a primary winding arranged in series with the power switch.

5. The controller of claim 4, wherein the switched-mode power converter comprises a protection circuit arranged in parallel to the primary winding, and arranged in series with the power switch.

6. The controller of claim 1, wherein the controller is implemented as an integrated circuit.

7. A driver circuit configured to provide a drive voltage to a load, wherein the driver circuit comprises:
    a switched-mode power converter comprising a switch;
    a current sensing means configured to determine a sensed current signal indicative of a current through the switch; and
    a controller configured to control the switched-mode power converter comprising a control pin for controlling a state of a power switch of the switched-mode power converter using a control signal, a sensing pin for receiving a sensed current signal indicative of a current through the power switch,
    wherein the controller is configured to detect a break-through situation based on the state of the power switch and the sensed current signal,
    wherein the controller is configured to control a multi-stage converter comprising a first converter stage providing an input voltage to the switched-mode power converter, and wherein the controller is configured to control the first converter stage to reduce the input voltage subsequent to detecting a break-through situation of the power switch, and
    configured to determine a gate control signal for putting the switch into an off-state based on the sensed current signal.

8. The driver circuit of claim 7 wherein the load comprises a solid state light source.

9. The driver circuit of claim 7 wherein the current sensing means comprises a current sensing resistor in series with the switch.

10. The driver circuit of claim 7 further comprising an output capacitor at a the output of the switched-mode power converter, configured to store an electrical charge to be provided to the load, wherein the driver circuit is configured to transfer electrical energy from an inductor of the switched-mode power converter to the output capacitor during the off state of the switch.

11. A method for detecting a break-through situation of a power switch of a switched-mode power converter, wherein the switched-mode power converter is a converter stage of a multi-stage converter; wherein the multi-stage converter comprises a first converter stage upstream of the switched-mode power converter configured to provide an input voltage to the switched-mode power converter, comprising:
    controlling a state of a power switch of the switched-mode power converter;
    receiving a sensed current signal indicative of a current through the power switch;
    detecting a break-through situation of the power switch based on the state of the power switch and on the sensed current signal; and
    controlling the first converter stage to reduce the input voltage, subsequent to detecting a break-through situation of the power switch.

12. The method of claim 11, further comprising assigning the switched-mode power converter to a category based on the detected break-through situation.

13. The method of claim 11, wherein the switched-mode power converter is configured to convert electrical energy at an input voltage to electrical energy at an output voltage, and further comprising:

varying the input voltage; and determining an input voltage for which a break through situation of the power switch occurs.

14. A light bulb assembly comprising:

a housing;

a solid state light source located within the housing;

an electrical connection module attached to the housing and adapted for connection to a mains supply; and a driver circuit comprising:

a switched-mode power converter comprising a switch;

a current sensing means configured to determine a sensed current signal indicative of a current through the switch; and a controller configured to control the switched-mode power converter comprising a control pin for controlling a state of a power switch of the switched-mode power converter using a control signal, a sensing pin for receiving a sensed current signal indicative of a current through the power switch, wherein the controller is configured to detect a break-through situation based on the state of the power switch and the sensed current signal, wherein the controller is configured to control a multi-stage converter comprising a first converter stage providing an input voltage to the switched-mode power converter, and wherein the controller is configured to control the first converter stage to reduce the input voltage subsequent to detecting a break-through situation of the power switch, and configured to determine a gate control signal for putting the switch into an off-state based on the sensed current signal.

* * * * *